(12) United States Patent
Bollman et al.

(10) Patent No.: US 8,171,429 B2
(45) Date of Patent: May 1, 2012

(54) APPLICATION NAVIGATION

(75) Inventors: Eric Bollman, San Francisco, CA (US); Heather McIntosh Cassano, Rancho Palos Verdes, CA (US); Chris S Jaffe, Burlingame, CA (US); Nina F Shih, San Marino, CA (US); Lin Su, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 885 days.

(21) Appl. No.: 12/130,803

(22) Filed: May 30, 2008

(65) Prior Publication Data

US 2009/0300552 A1  Dec. 3, 2009

(51) Int. Cl.
G06F 3/14 (2006.01)
G06F 3/17 (2006.01)

(52) U.S. Cl. ........ 715/854; 715/513; 715/719; 715/840; 715/841; 715/855; 715/762; 700/103; 707/102; 719/310

(58) Field of Classification Search .......... 715/200–277, 715/700–867, 513; 700/701–866; 709/201–229; 705/50–79; 345/30–111; 707/1–10, 100–104.1, 707/200–206; 719/310
See application file for complete search history.

(56) References Cited

U.S. PATENT DOCUMENTS

| | | | |
|---|---|---|---|
| 7,240,296 B1 * | 7/2007 | Matthews et al. | 715/840 |
| 7,703,026 B2 * | 4/2010 | Bechtold et al. | 715/762 |
| 2005/0198567 A1 * | 9/2005 | Vermeulen et al. | 715/513 |
| 2006/0015878 A1 * | 1/2006 | Ritter | 719/310 |
| 2006/0184901 A1 * | 8/2006 | Dietz | 715/855 |
| 2007/0074116 A1 * | 3/2007 | Thomas | 715/719 |
| 2008/0294680 A1 * | 11/2008 | Powell et al. | 707/102 |
| 2009/0037013 A1 * | 2/2009 | Hendler et al. | 700/103 |
| 2009/0178009 A1 * | 7/2009 | Dotson et al. | 715/841 |

* cited by examiner

*Primary Examiner* — Ruay Ho
(74) *Attorney, Agent, or Firm* — Brinks Hofer Gilson & Lione (57) ABSTRACT

A method for operating a user interface for switching between computer applications is provided. The method may include displaying first, second and third navigation controls. The first navigation control may include entity selectors, the second navigation control may include application selectors, and the third navigation control may include sub-application selectors. The application selectors may be associated with the entities in the first navigation control and the sub-application selectors may be associated with the application selectors. An application associated with sub-application selector may be launched upon selecting the sub-application selector. The state of an application may be stored and retrieved upon switching between applications so as to enable fast switching between applications.

19 Claims, 8 Drawing Sheets

APPLICATION NAVIGATION

BACKGROUND

The Internet has emerged as a powerful advertising tool. It is common place to see advertisements on many web sites. For example, advertisements may be displayed on search web sites and may be targeted to individuals based upon search terms provided by the individuals. Other web sites, such as news and sports web sites, may provide space for advertisements. The owners of these web sites may sell advertising space to advertisers to supplement the costs associated with operating the web sites as well as to turn a profit.

As the internet has grown, the number of web sites available for hosting advertisements has increased. The diversity between web sites has also increased. That is, the number of web sites focusing on selective groups of individuals has increased. For example, some web sites cater to gaming enthusiasts. Some may cater to woman in a certain age group. As a result of the increase, it has become increasingly difficult for advertisers to optimize their advertising budgets. For example, some web sites may be better suited to a particular advertiser's products than others. Advertisers unfamiliar with the vast number of web sites available for hosting advertisements may choose to host their respective advertisements on a less than optimal host web site and this may result in a lower rate of return for the advertiser.

The problem above has led to the creation of the ad broker. The ad broker is a person that matches advertiser advertisements to publisher web sites. The publisher web sites may include regions for displaying advertisements. The ad brokers may receive information from advertisers about the customers they are targeting. Publishers may provide the ad broker with information about individuals that frequent the publisher's web sites. Using this information, the ad broker may match the advertisement to the publisher web site. However, the steps involved in performing this operation on a large scale can be unwieldy. Computer applications may aid the ad broker to some extent. However, keeping track of the information provided from numerous advertisers and publishers may still prove challenging. In some cases, the ad broker may be dealing with multiple orders at the same time and switching between the orders may prove time consuming and prone to error.

DETAILED DESCRIPTION OF THE DRAWINGS AND THE PRESENTLY PREFERRED EMBODIMENTS

Figure 1:
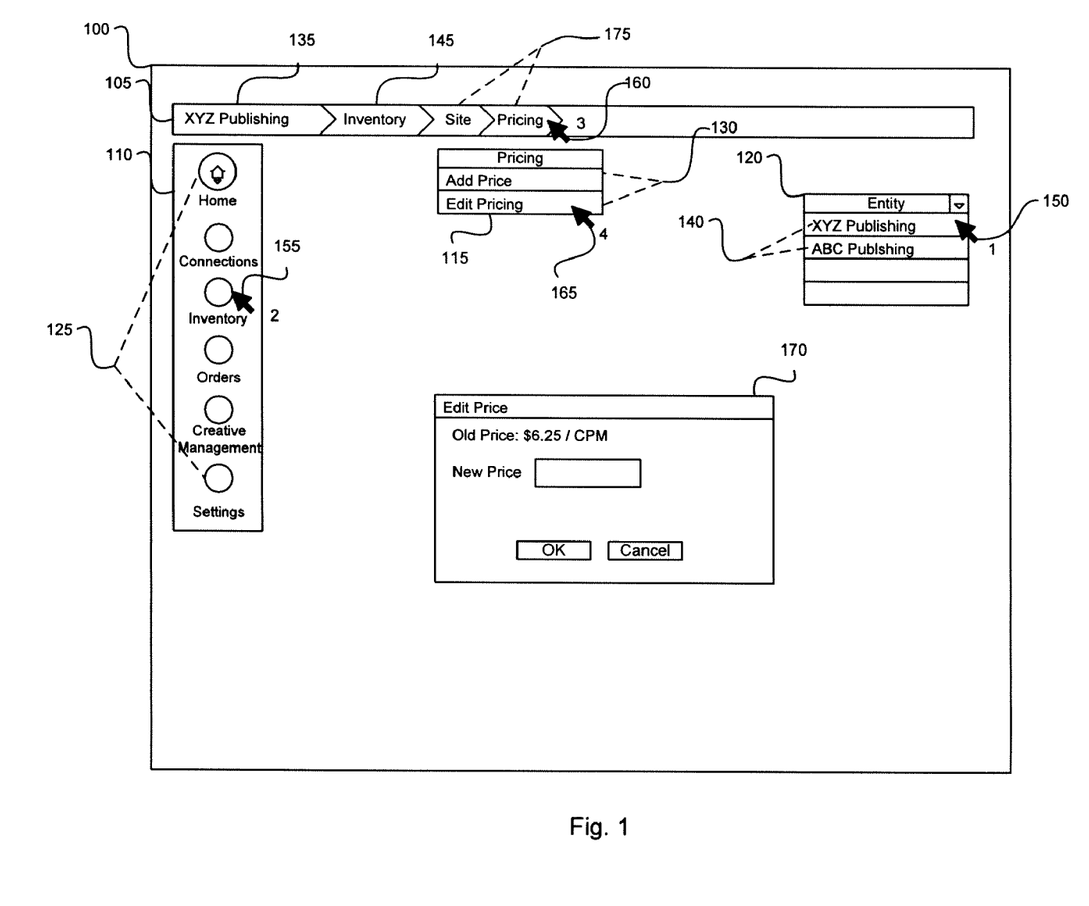
FIG. 1 is a user interface for selecting and launching applications.

FIG. 1 is a user interface 100 for selecting and launching applications. The user interface 100 includes an entity selector 120, an application selector 110, a sub-application selector 105, and a core application 170. The user interface may be produced, for example, on a display of a device such as a computer monitor, portable computer or personal digital assistant such as a cellular telephone. Generally, a processor of the device operates in response to instructions and data stored in memory of the device to produce the images of the user interface and to detect user interactions with the user interface. User interactions may occur using a mouse, stylus on a touch sensitive screen or by any other suitable method. The arrangement of the entity selector 120, application selector 110, and sub-application selector 105 in FIG. 1 is intended to be exemplary only.

The entity selector 120 corresponds to a control with a list of entity objects 140. An entity object 140 may correspond to a parent object in a tree of objects, where children objects lie below the parent object in the tree. Objects may include information for defining graphics, text, and/or execution instructions. The information may be stored as data having any suitable format, in a database or other memory, either locally or at a location accessible over a network. Different objects may include different information. Objects may also include links to other objects. For example, a parent object may include links to children objects. In the preferred embodiment, an entity object 140 includes data that defines a set of operations that may be performed on the entity object 140. Selecting an entity object 140 may populate the application selector 110 with information related to the set of operations. A name associated with a selected entity object 140 may be displayed in an entity name region 135 of the sub-application selector 105.

The application selector 110 corresponds to a control with a list of application objects 125. Each application object 125 may correspond to an object in the tree of objects described above. As such, each application object 125 may correspond to a parent object and/or a child object depending on the position of the application object 125 in the tree. In the preferred embodiment, each application object 125 is a child object of an entity object 140. Each application object 125 may correspond to a top level of an application for performing operations on an entity object 140. Each application object 125 may include data that defines a set of sub-operations that may be performed within each application object 125. The data may include links to child objects that define the sub-operations or sub-applications. A name associated with a selected application object 125 may be displayed in an application name region 145 of the sub-application selector 105.

The sub-application selector 105 corresponds to a control that enables selecting and launching a core application 170. The sub-application selector 105 includes an entity name region 135 for displaying a name corresponding to the entity object 140 selected in the entity selector 120. Thus, in the example illustrated in FIG. 1, the name "XYZ Publishing" is shown in both entity name region 135 and entity selector 120. The sub-application selector 105 may also include an application name region 145 for displaying a name correspond to the application object 125 selected in the application selector 110. Thus the application name "Inventory" is shown in the application name region 145, indicating the selection of the Inventory application object 125 in the application selector 110 in the example of FIG. 1.

The sub-application selector 105 may display information related to sub-application objects 175, such as a name of a sub-application object 175. Each sub-application object 175 may include the general object properties described above. For example, each object may correspond to a parent object and/or a child object. Each sub-application object 175 may include data that may enable selecting other sub-application objects 175 or launching core applications 170. In the preferred embodiment, a pointer 160 is positioned over the name of a sub-application object 175 in the sub-application selector 105. In response to user actuation of the user interface 100, such as a mouse click, a popup menu 115 is then displayed below the sub-application object 175 and includes menu items 130 that correspond to child sub-application objects and/or core applications 170. The name of a selected child sub-application object 175 in the popup menu 115 may be displayed next to the name of the corresponding parent object.

In operation, an entity object 140 in the entity selector 120 may be selected, as represented by first arrow 150. For example, a user may select the entity object 140 "XYZ publishing" shown in entity selector 120. User selection may occur by actuation of a mouse button. After selecting the entity object 140, and in response thereto, a name and/or graphic icon corresponding to the selected entity object 140 may be displayed in the name region 135 of the sub-application selector 105. In addition, the application selector 110 may be populated with information corresponding to application objects 125 associated with the selected entity object 140. The information may include names and/or graphic icons corresponding to the application objects 125 associated with the entity object 140. For example, as shown in the application selector 110 of the exemplary embodiment of FIG. 1, a home icon and the names of various applications may be displayed, such as "Home", "Connections", "Inventory", "Orders", "Creative Management", and "Settings." Each application object 125 displayed may correspond to a child object of the selected entity object 140.

Next, an application object 125 in the application selector 110 may be selected, as represented by second arrow 155. Again, the user may interact with the user interface by means of any suitable action, such as a mouse click or stylus stoke. The action is detected by the user interface and, in response, a suitable change is made to the display. After selecting the application object 125, a name associated with the selected application object 125 may be displayed in the application name region 145 of the sub-application selector 105. For example, as shown, a user may select the inventory application and "Inventory" may be displayed. Next, sub-application objects 175 associated with the selected application object 125 may be selected until a desired core application 170 is reached, as shown in FIG. 2.

Figure 2:
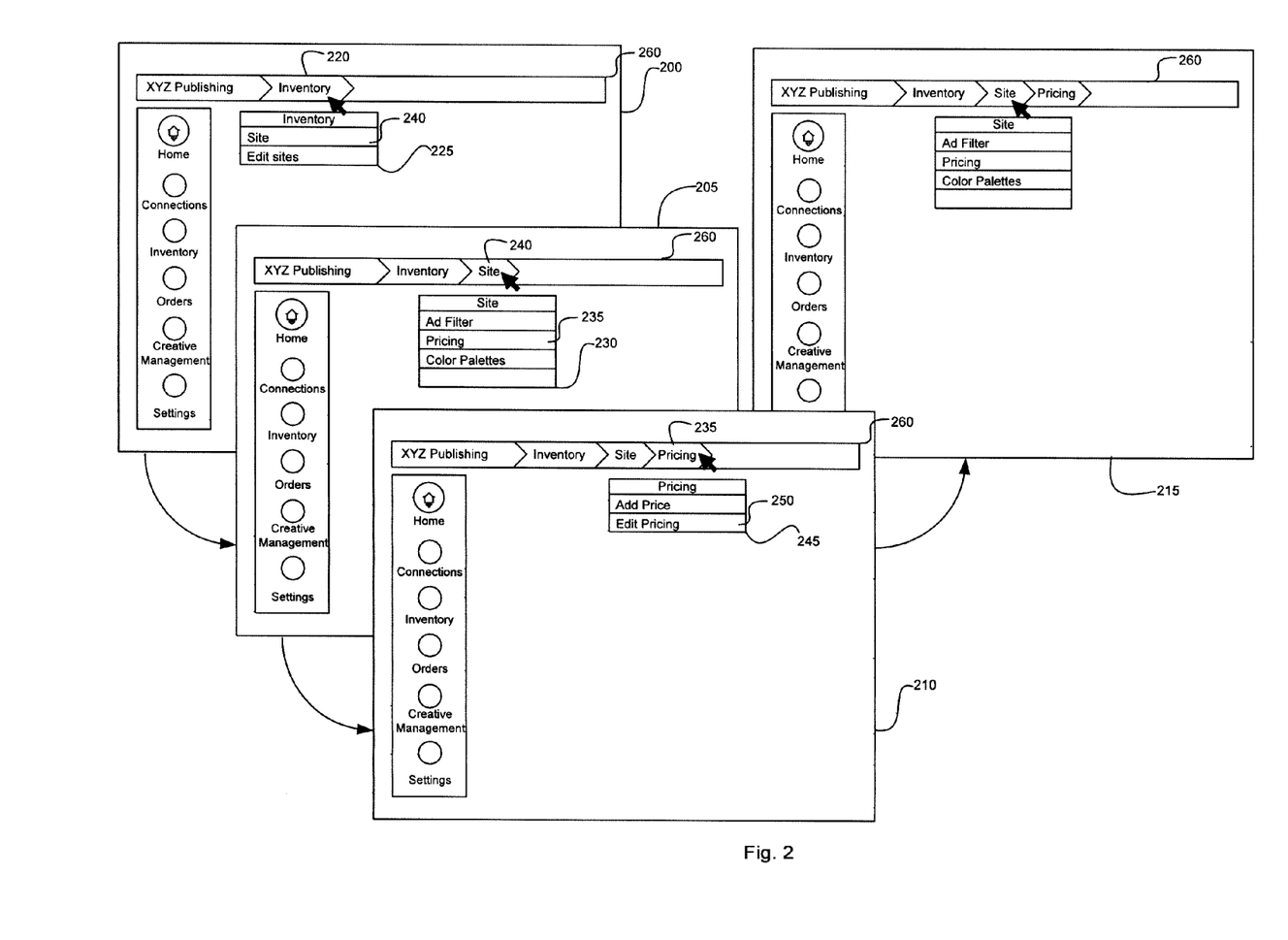
FIG. 2 illustrates the sequences involved in navigating a sub-application selector.

FIG. 2 illustrates the sequences involved in navigating the sub-application selector 105, shown in FIG. 1. At the first sequence 200, a pointer may be positioned by the user over the application name region 220 of the sub-application selector 260. This in turn may generate a first popup menu 225 with menu items corresponding to sub-application objects and/or core applications that are child objects of the corresponding application object. A first sub-application object 240 may then be selected.

At the second sequence 205, the name of the first selected sub-application object 240 is added to the sub-application selector. A second popup menu 230 with sub-application objects and/or core applications that are child objects of the first sub-application object 240 may be displayed when the pointer is positioned over the name of the first sub-application object 240. A second sub-application object 235 may then be selected.

At the third sequence 210, the name of the second selected sub-application object 235 is added to the sub-application selector 260. A third popup menu 245 with sub-application objects and/or core applications that are child objects of the second sub-application object 235 may be displayed when the pointer is positioned over the name of the second sub-application object 235.

The pointer may then be positioned by the user over a previously displayed sub-application object as shown in the fourth sequence. This enables selecting other sub-application objects and/or core applications in a single operation. The pointer may also be positioned over the application name region 145 (FIG. 1) so as to select different sub-application objects associated with the application. The pointer may also be positioned over the entity name region 135 (FIG. 1) so as to select different application objects associated with the entity object. Returning to the third sequence 210, a core application menu item 250 may be selected. Selecting the core application menu item 250 launches a core application, such as the core application 170 shown in FIG. 1.

Figure 3:
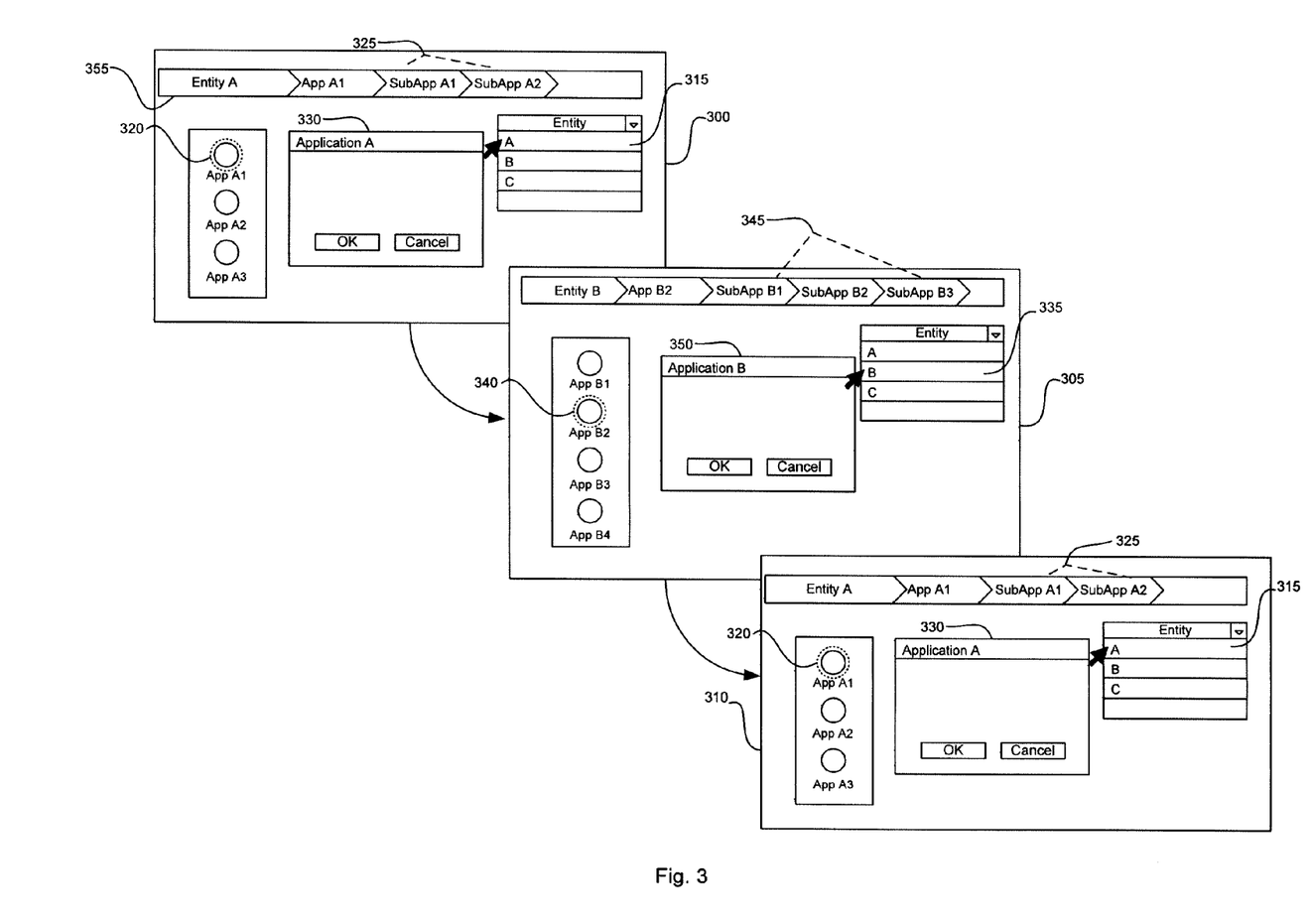
FIG. 3 is a series of sequences illustrating switching between applications corresponding to different entities.

FIG. 3 is a series of sequences illustrating switching between applications corresponding to different entities. Referring to the first sequence 300, a first entity object 315, followed by an application object 320, followed by a sequence of sub-application objects 325 may be selected, as described with reference to FIG. 1 and FIG. 2 above, so as to launch a first application 330. For example, as shown in the first sequence 300, entity A may be selected, followed by application App A1, followed by the sequence of sub-applications SubApp A1 and SubApp A2 to launch Application A.

At the second sequence 305, a second entity object 335, second application object 340 and second series of sub-application objects 345 may be selected so as to launch a second application 350. Prior to selecting the second entity object 335, the state associated with the first entity object 315 may be stored by the user interface. For example, the various parameters associated with first application 330 may be stored. Application path information may be stored as well. The application path information may represent the state of the user interface associated with the first entity object 315. For example, the application path information may store information that may be utilized to redraw the sub-application selector 355 as shown in the first sequence 300. In other words, the application path information may be utilized to redraw the user interface as it appears in the first sequence 300.

At the third sequence 310, the first entity object 315 may be selected so as to access the first application 330. Prior to switching away from the second application 350, the state associated with the second entity object 335 may be stored as described above. After the state has been stored, the state information associated with the first entity object 315 may be retrieved to recreate the user interface as shown in the first sequence 300.

Storing the state enables switching between applications within different entities in a single operation. For example, in the web site advertisement context, the user interface may be adapted to an application for managing advertisement placements on publisher web sites. Entity objects may correspond to different publishers, where each publisher manages a web site for hosting advertisements. Application objects, sub-application objects, and core applications may be provided for specifying pricing information and for specifying advertisement information for each publisher. An ad broker may specify pricing information for the first publisher by selecting the appropriate entity object, application object, series of sub-application objects, and core application for specifying pricing information. The ad broker may then specify advertisement information for the second publisher by selecting the appropriate entity object, application object, series of sub-application objects, and core application for specifying the advertisement information. The ad broker may then return to entering the pricing information for the first publisher by selecting the publisher in the entity selector. The ad broker need not select an application object, series of sub-applications object, and core application as the user interface will have returned to the previous state. This fast switching saves the ad broker time, reduces complexity and improves accuracy for the ad broker.

Figure 4:
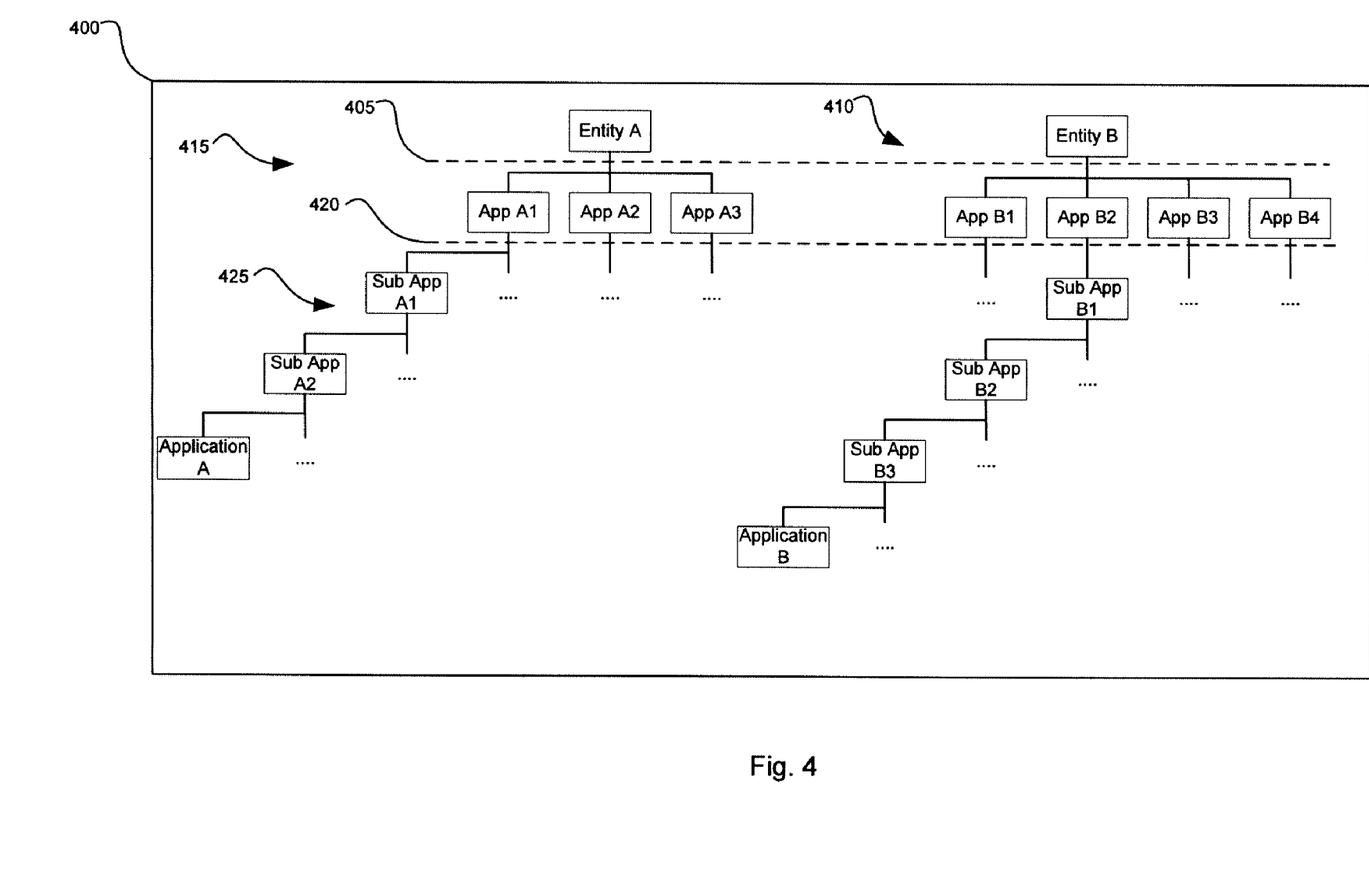
FIG. 4 is a diagram illustrating the relationship between the various objects described in FIG. 3.

FIG. 4 is a diagram 400 illustrating the relationship between the various objects described in FIG. 3 above. Shown in the diagram 400 is a first tree 405 and second tree 410. Each tree includes an entity object level 405, an application object level 420, and a sub application object level 425. The entity object level 405 in each tree includes a single entity object. In the web site publishing context, each entity object may correspond to a different publisher.

The application object level 420 includes one or more applications associated with the entity object at the entity object level 405 above. As described above, each application object may correspond to a top level of an application for performing operations on an entity object. Each application object 125 may include data that defines a set of sub-operations that may be performed within each application object. The data may include links to child objects that define the sub-operations or sub-applications. In the web site publishing context, each application object may correspond to the top level of an application for performing operations associated with the publisher. For example, a first application may be utilized to associate advertiser advertisements to the publisher's web site. A second application may be utilized to specify pricing information associated with the publisher's web site.

The sub-application object level 425 may include one or more sub-applications associated with a respective parent application object. Each sub-application object may include data that may enable selecting other sub-application objects or launching core applications. The terminal object in any branch may correspond to a core application, such as Application A shown in the first tree 415. The core applications may be utilized to specify or retrieve information associated with the entity object. For example, as described above, a core application might correspond to an application for entering pricing information associated with a publisher's web site.

As illustrated in the diagram 400, the structure of the first tree 415 and second tree 410 may be different as the entities may be entirely different. Although the examples provided above relate to web site advertising, other embodiments are contemplated. For example, the user interface may be adapted to an application for selling goods and/or services. For example, a first entity may correspond to a good such as clothing. A second entity may correspond to a service, such as a yard maintenance service. Via the user interface, a user may select either the good or the service. Upon making the selection, the application selector may be populated with applications associated with the different entities. For example, in the clothing context, different applications may be provided for different types of clothing. Information related to the different types of clothing may be specified via various core applications that may be accessed via sub-applications shown in the sub-application selector.

Via the same user interface, a user may select the yard maintenance service entity. In this case, the application selector may be populated with applications, and the sub-application selector populated with sub-applications, that enable specifying information associated with the yard maintenance service entity. For example, an application may be provided to specify a time and place of where the service is needed. Another application may be utilized to specify the types of services required, such as lawn mowing, tree trimming, etc.

One of ordinary skill would appreciate that the user interface may be adapted to other applications, such as Internet bidding services or Internet services for purchasing products to name a few.

Figure 5:
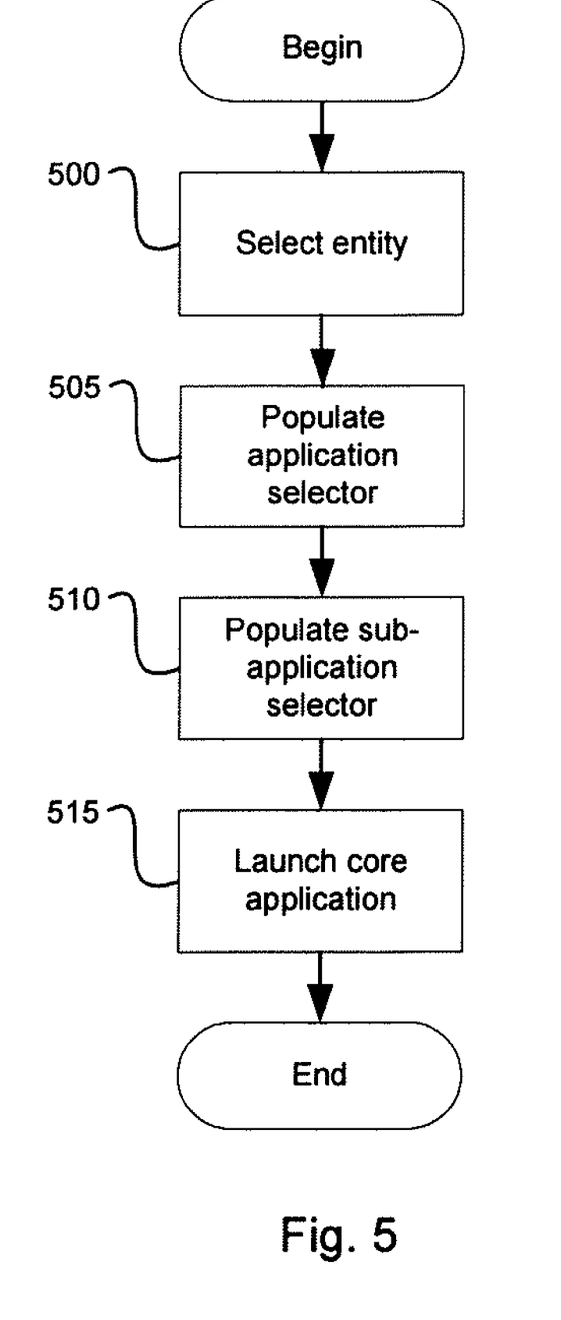
FIG. 5 is a flow diagram for navigating through the user interface in a first embodiment.

FIG. 5 is a flow diagram for navigating through the user interface in a first embodiment. At block 500, an entity object is selected. For example, with reference to FIG. 1 above, an entity object 140 may be selected in the entity object selector 120. A name associated with the entity object 140 may be displayed in an entity name region 135 of a sub-application selector 105, as shown in FIG. 1.

At block 505, an application selector 110 may be displayed and populated with application objects 125 associated with the selected entity object 140. The number and type of application objects 125 may vary based on the type of entity. For example, a first entity object may be related to goods and a second entity object may be related to services, as described with reference to FIG. 4 above.

At block 510, a pointer may be positioned over the application name region 145 of the sub-application selector 105, as shown in FIG. 2. With reference to FIG. 2, a popup menu 225 with menu items corresponding to either sub-application objects or core applications may be displayed. The menu items may be associated with the selected application object 220. In other words, different menu items may be associated with different applications objects. A menu item corresponding to a sub-application may then be selected. In this case, the name associated with the sub-application object may be added to the sub-application selector. The process of selecting sub-applications may repeat until a desired core application is located as illustrated in the first sequence 200, second sequence 205, third sequence 210, and fourth sequence 215 shown in FIG. 2.

At block 515, the desired core application is launched and displayed within the user interface. The core application enables specifying and retrieving information associated with the entity. For example, with reference to FIG. 1, a core application 170 for specifying pricing information may be displayed.

Figure 6:
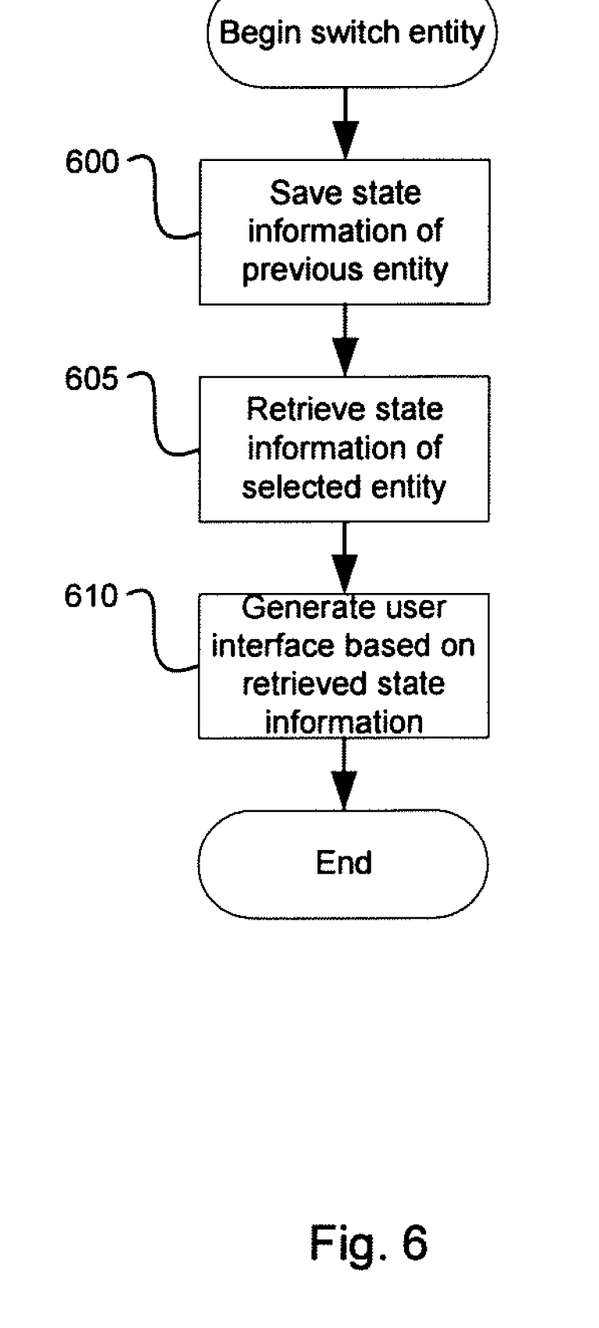
FIG. 6 is flow diagram for switching between entities.

FIG. 6 is flow diagram for switching between entities. The blocks described herein may be utilized in conjunction with the blocks described in FIG. 5. At block 600, a new entity object may be selected. After selecting the entity, the state information associated with the previous entity object may be stored. For example, various parameters associated with a previously launched application associated with the previous entity object may be stored. Application path information associated with the previous entity may be stored as well. For example, the application path information may include a list including the application object and sub-application objects traversed to launch the previous application. This information may be utilized later to populate the sub-application selector so that it displays the same series of objects as previously shown.

At block 605, the state information associated with the newly selected entity object may be retrieved if it exists. At block 610, the user interface may be recreated to appear as it did the last time the new entity object was utilized. For example, the last core application launched may be displayed. Parameters within the core application may be updated to reflect the last state of the second entity. The stored path information may be utilized to populate the application selector and sub-application selector. As discussed with reference to FIG. 3 above, storing and retrieving the state information associated with an entity object enables fast switching between applications, which saves time.

Figure 7:
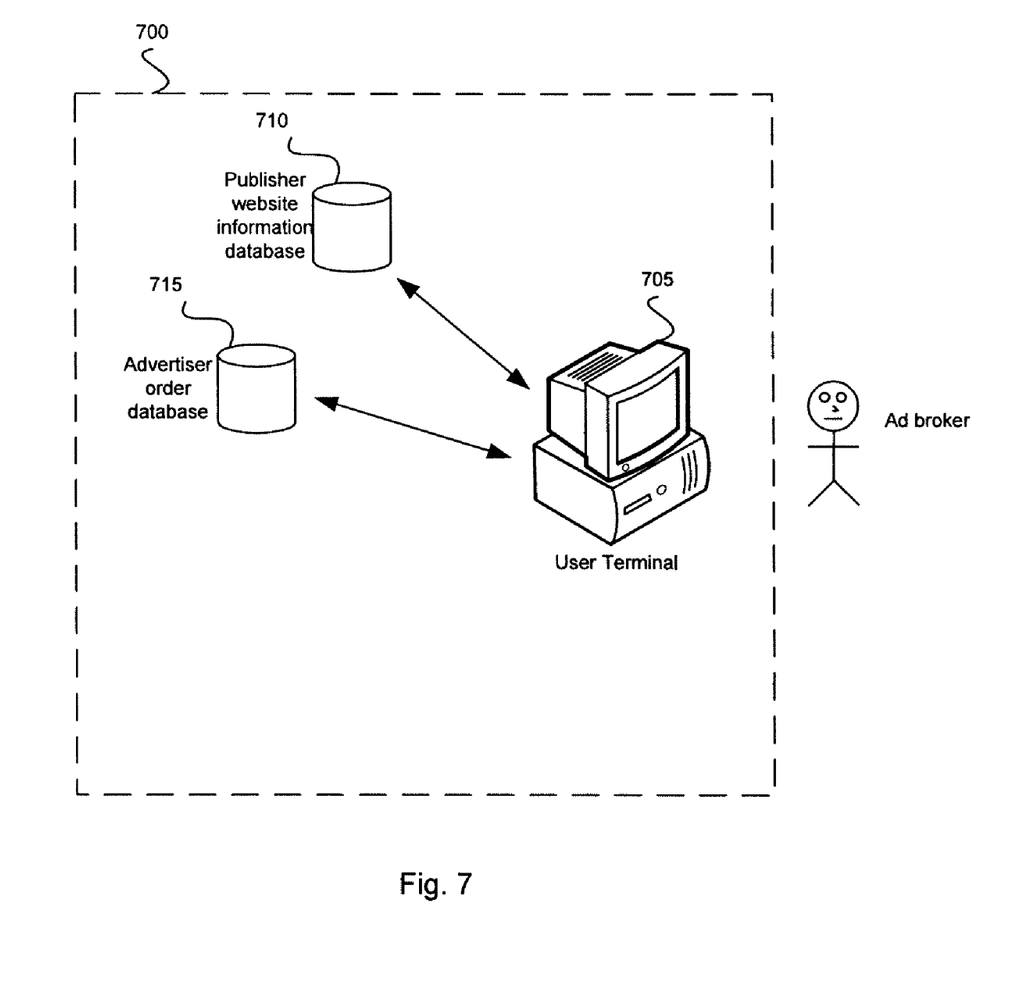
FIG. 7 is a system for executing an application including a user interface as described in FIG. 1.

FIG. 7 illustrates a system 700 that may execute an application including the user interface described above so as to enable an ad broker to match advertiser advertisements to publisher web sites. The system 700 includes a computer 705 in communication with a publisher web site information database 710 and an advertiser order database 715. The computer 705 may comprise suitable logic, code, and/or circuitry that may enable operating a computer program for performing the operations described above. For example, the computer 705 may be configured to operate an application with a user interface as described above. The user interface may include entity objects corresponding to publishers and advertisers. Application objects, sub-application objects and core applications may be provided for specifying order information from advertisers and web site information from publishers. The system 700 may be adapted to store the information into a database. For example, information related to publisher web sites may be stored in the publisher information database 710 and advertiser orders may be stored in the advertiser order database 715.

The computer 705 may also be configured to execute an application for matching orders communicated from the advertisers to publisher web sites. For example, via the user interface, application objects may be provided that enable the entry of advertiser orders and publisher web site information. The application objects may be utilized to store information in the advertiser order database 715 and publisher web site information database 710. Application objects may be provided that enable searching through the publisher web site information database 710 for publisher web sites that may be suitable for displaying an advertiser advertisement.

The computer 705 may also be configured to execute other application objects via the user interface. For example, an application object that enables booking advertisement placements on the publisher websites may be provided.

Figure 8:
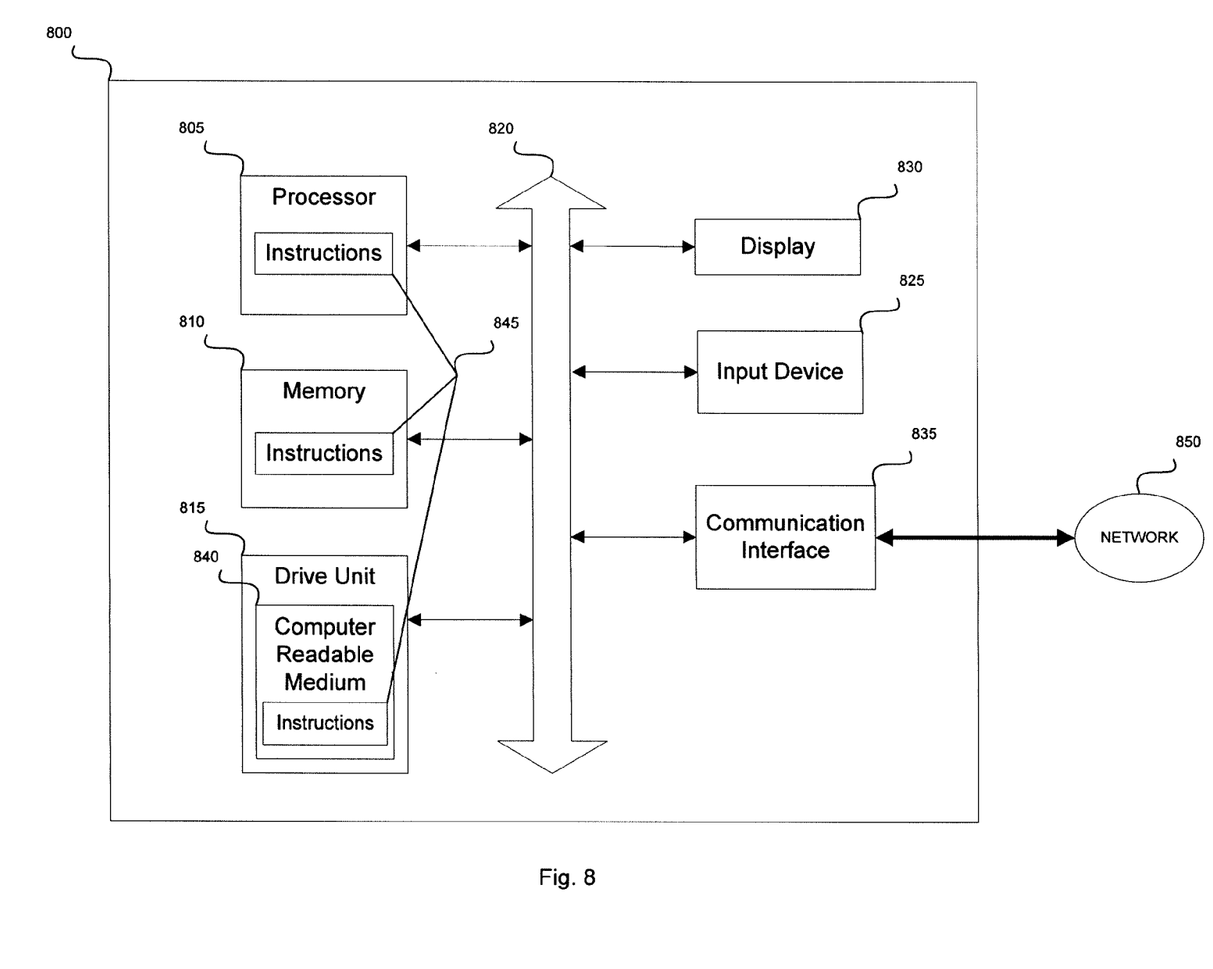
FIG. 8 illustrates a general computer system, which may represent any of the computing devices referenced herein.

FIG. 8 illustrates a general computer system, which may represent the computer 700 in FIG. 7 or any of the other computing devices referenced herein. The computer system 800 may include a set of instructions 845 that may be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 845 (sequential or otherwise) that specify actions to be taken by that machine. In one embodiment, the computer system 800 may be implemented using electronic devices that provide voice, video or data communication. Further, while a single computer system 800 may be illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 805, such as, a central processing unit (CPU), a graphics processing unit (GPU), or both. The processor 805 may be a component in a variety of systems. For example, the processor 805 may be part of a standard personal computer or a workstation. The processor 805 may be one or more general processors, digital signal processors, application specific integrated circuits, field programmable gate arrays, servers, networks, digital circuits, analog circuits, combinations thereof, or other now known or later developed devices for analyzing and processing data. The processor 805 may implement a software program, such as code generated manually (i.e., programmed).

The computer system 800 may include a memory 810 that can communicate via a bus 820. For example, the advertisement listing database 110, database with website links 140, and multimedia advertisement database may be stored in the memory. The memory 810 may be a main memory, a static memory, or a dynamic memory. The memory 810 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 810 may include a cache or random access memory for the processor 805. Alternatively or in addition, the memory 810 may be separate from the processor 805, such as a cache memory of a processor, the system memory, or other memory. The memory 810 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 810 may be operable to store instructions 845 executable by the processor 805. The functions, acts or tasks illustrated in the figures or described herein may be performed by the programmed processor 805 executing the instructions 845 stored in the memory 810. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 800 may further include a display 830, such as a liquid crystal display (LCD), an organic light emitting diode (OLED), a flat panel display, a solid state display, a cathode ray tube (CRT), a projector, a printer or other now known or later developed display device for outputting determined information. The display 830 may act as an interface for the user to see the functioning of the processor 805, or specifically as an interface with the software stored in the memory 810 or in the drive unit 815.

Additionally, the computer system 800 may include an input device 830 configured to allow a user to interact with any of the components of system 800. The input device 825 may be a number pad, a keyboard, or a cursor control device, such as a mouse, or a joystick, touch screen display, remote control or any other device operative to interact with the system 800.

The computer system 800 may also include a disk or optical drive unit 815. The disk drive unit 815 may include a computer-readable medium 840 in which one or more sets of instructions 845, e.g. software, can be embedded.

Further, the instructions 845 may perform one or more of the methods or logic as described herein. The instructions 845 may reside completely, or at least partially, within the memory 810 and/or within the processor 805 during execution by the computer system 800. The memory 810 and the processor 805 also may include computer-readable media as discussed above.

The present disclosure contemplates a computer-readable medium 840 that includes instructions 845 or receives and executes instructions 845 responsive to a propagated signal; so that a device connected to a network 850 may communicate voice, video, audio, images or any other data over the network 850. The instructions 845 may be implemented with hardware, software and/or firmware, or any combination thereof. Further, the instructions 845 may be transmitted or received over the network 850 via a communication interface 835. The communication interface 835 may be a part of the processor 805 or may be a separate component. The communication interface 835 may be created in software or may be a physical connection in hardware. The communication interface 835 may be configured to connect with a network 850, external media, the display 830, or any other components in system 800, or combinations thereof. The connection with the network 850 may be a physical connection, such as a wired Ethernet connection or may be established wirelessly as discussed below. Likewise, the additional connections with other components of the system 800 may be physical connections or may be established wirelessly.

The network 850 may include wired networks, wireless networks, or combinations thereof. Information related to business organizations may be provided via the network 850. The wireless network may be a cellular telephone network, an 802.11, 802.16, 802.20, or WiMax network. Further, the network 850 may be a public network, such as the Internet, a private network, such as an intranet, or combinations thereof, and may utilize a variety of networking protocols now available or later developed including, but not limited to TCP/IP based networking protocols.

The computer-readable medium 840 may be a single medium, or the computer-readable medium 840 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 840 may include a solid-state memory such as a memory card or other package that houses one or more non-volatile read-only memories. The computer-readable medium 840 also may be a random access memory or other volatile re-writable memory. Additionally, the computer-readable medium 840 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which included all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

From the foregoing, it may be seen that the embodiments disclosed herein provide an approach for generating a user interface that enables switching quickly and efficiently between applications. For example, entities, applications and sub-applications may be organized in a tree. The applications may be associated with the entities and may be different for different entities. The sub-applications may be associated with the applications and may be different for different applications. State information associated with an entity may be stored and later retrieved to enable quickly restoring the state of the user interface. This enables quickly switching between applications in different entities.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method for switching between applications, the method comprising:

defining a tree hierarchy with a group of nodes related to one another in terms of a parent-child relationship, wherein the tree hierarchy includes a first level of nodes, a second level of nodes, and a third level of nodes, wherein each second level node is a child of one of the first level nodes, and each third level node is a child of one of the second level nodes, wherein each first level node represents one of a plurality of entities, each second level node represents one of a plurality of applications, and each third level node represents one of a plurality of sub-applications;

simultaneously displaying, by a computer, first, second, and third navigation controls configured to respectively display first and second entities, one or more applications that are children of the first entity, and a first sub application that is a child of one of the applications;

receiving, at the computer and via the first navigation control, a user selection of the second entity in the first navigation control;

in response to the user selection, determining, by the computer, one or more applications that are children of the second entity, and a second sub application that is a child of one of the one or more applications that are children of the second entity;

configuring the second and third navigation controls to respectively display the one or more applications that are children of the second entity and the second sub application, wherein reconfiguring of the third navigation from displaying the first sub application to displaying the second sub application occurs without traversal of the tree hierarchy.

2. The method according to claim 1, further comprising:
executing instructions for launching an application associated with a selected sub-application in the third navigation control.

3. The method according to claim 1, further comprising:
executing instructions for launching an application associated with a selected application in the second navigation control.

4. The method according to claim 1, further comprising displaying additional sub-applications in the third navigation control in response to receiving a sub-application selection.

5. The method according to claim 1, further comprising displaying a popup menu including a list of sub-applications in response to receiving a sub-application selection.

6. The method according to claim 5, further comprising:
receiving a popup menu selection corresponding to a selected sub-application in the list of sub-applications; and
displaying the selected sub-application in the third navigation control.

7. A machine-readable storage medium having stored thereon, a computer program comprising at least one code section for switching between applications, the at least one code section being executable by a machine for causing the machine to perform acts of:

defining a tree hierarchy with a group of nodes related to one another in terms of a parent-child relationship, wherein the tree hierarchy includes a first level of nodes, a second level of nodes, and a third level of nodes, wherein each second level node is a child of one of the first level nodes, and each third level node is a child of one of the second level nodes, wherein each first level node represents one of a plurality of entities, each second level node represents one of a plurality of applications, and each third level node represents one of a plurality of sub-applications;

simultaneously displaying first, second, and third navigation controls configured to respectively display first and second entities, one or more applications that are children of the first entity, and a first sub application that is a child of one of the applications;

receiving, via the first navigation control, a user selection of the second entity in the first navigation control;

in response to the user selection, determining one or more applications that are children of the second entity, and a second sub application that is a child of one of the one or more applications that are children of the second entity;

configuring the second and third navigation controls to respectively display the one or more applications that are children of the second entity and the second sub application, wherein reconfiguring of the third navigation from displaying the first sub application to displaying the second sub application occurs without traversal of the tree hierarchy.

8. The machine-readable storage medium according to claim 7, wherein the at least one code section comprises code that enables executing instructions for launching an application associated with a selected sub-application selector in the third navigation control.

9. The machine-readable storage medium according to claim 7, wherein the at least one code section comprises code that enables storing a state of the application so as to enable returning to the application and restoring a state of the application.

10. The machine-readable storage medium according to claim 7, wherein the at least one code section comprises code that enables executing instructions for launching an application associated with a selected application in the second navigation control.

11. The machine-readable storage medium according to claim 7, wherein the at least one code section comprises code that enables displaying additional sub-application selectors in the third navigation control in response to receiving a sub-application selection.

12. The machine-readable storage medium according to claim 7, wherein the at least one code section comprises code that enables displaying a popup menu including a list of sub-applications selectors in response to receiving a sub-application selection.

13. The machine-readable storage medium according to claim 12, wherein the at least one code section comprises code that enables receiving a popup menu selection corresponding to a selected sub-application in the list of sub-applications; and
displaying the selected sub-application in the third navigation control.

14. A system for switching between applications, the system comprising:
circuitry configured to define a tree hierarchy with a group of nodes related to one another in terms of a parent-child relationship, wherein the tree hierarchy includes a first level of nodes, a second level of nodes, and a third level of nodes, wherein each second level node is a child of one of the first level nodes, and each third level node is a child of one of the second level nodes, wherein each first level node represents one of a plurality of entities, each second level node represents one of a plurality of applications, and each third level node represents one of a plurality of sub-applications;

display circuitry configured to simultaneously display first, second, and third navigation controls configured to respectively display first and second entities, one or more applications that are children of the first entity, and a first sub application that is a child of one of the applications;

receiving logic configured to receive, via the first navigation control, a user selection of the second entity in the first navigation control, and in response to the user selection, determine one or more applications that are children of the second entity, and a second sub application that is a child of one of the one or more applications that are children of the second entity;

wherein the display circuitry configures the second and third navigation controls to respectively display the one or more applications that are children of the second entity and the second sub application, wherein reconfiguring of the third navigation from displaying the first sub application to displaying the second sub application occurs without traversal of the tree hierarchy.

15. The system according to claim 14, wherein the circuitry enables executing instructions for launching an application associated with a selected sub-application selector in the third navigation control.

16. The system according to claim 14, wherein the circuitry enables executing instructions for launching an application associated with a selected application in the second navigation control.

17. The system according to claim 14, wherein the circuitry enables displaying additional sub-application selectors in the third navigation control in response to receiving a sub-application selection.

18. The system according to claim 14, wherein the circuitry enables displaying a popup menu including a list of sub-applications selectors in response to receiving a sub-application selection.

19. The system according to claim 18, wherein the circuitry enables receiving a popup menu selection corresponding to a selected sub-application in the list of sub-applications; and
displaying the selected sub-application in the third navigation control.

* * * * *